United States Patent
Kim

(10) Patent No.: US 9,501,187 B2
(45) Date of Patent: Nov. 22, 2016

(54) TOUCH SENSING APPARATUS USING SINGLE LAYER PATTERN AND METHOD FOR MANUFACTURING THE SAME

(71) Applicant: Melfas Inc., Seoul (KR)

(72) Inventor: Kwang Hyun Kim, Pyeongtaek-si (KR)

(73) Assignee: Melfas Inc., Seoul (KR)

( * ) Notice: Subject to any disclaimer, the term of this patent is extended or adjusted under 35 U.S.C. 154(b) by 0 days.

(21) Appl. No.: 14/273,160

(22) Filed: May 8, 2014

(65) Prior Publication Data
US 2014/0340596 A1    Nov. 20, 2014

(30) Foreign Application Priority Data
May 15, 2013    (KR) .................... 10-2013-0054950

(51) Int. Cl.
*G06F 3/041*    (2006.01)
*G06F 3/044*    (2006.01)

(52) U.S. Cl.
CPC ..... *G06F 3/044* (2013.01); *G06F 2203/04103* (2013.01); *G06F 2203/04107* (2013.01); *G06F 2203/04112* (2013.01); *Y10T 29/49155* (2015.01)

(58) Field of Classification Search
CPC combination set(s) only.
See application file for complete search history.

(56) References Cited

U.S. PATENT DOCUMENTS

| | | | | |
|---|---|---|---|---|
| 2008/0238433 A1* | 10/2008 | Joutsenoja et al. | ............ | 324/457 |
| 2010/0253646 A1* | 10/2010 | Hiratsuka | ............ | 345/174 |
| 2011/0095996 A1* | 4/2011 | Yilmaz | ............ | G06F 3/044 |
| | | | | 345/173 |
| 2012/0062472 A1* | 3/2012 | Yilmaz | ............ | G06F 3/041 |
| | | | | 345/173 |
| 2012/0162096 A1* | 6/2012 | Lin et al. | ............ | 345/173 |
| 2013/0169558 A1* | 7/2013 | Min | ............ | 345/173 |

FOREIGN PATENT DOCUMENTS

| | | |
|---|---|---|
| CN | 101794187 A | 8/2010 |
| CN | 202711219 U | 1/2013 |
| CN | 202815780 U | 3/2013 |
| CN | 202838286 U | 3/2013 |
| JP | 2010-182277 A | 8/2010 |
| JP | 3179159 U | 9/2012 |
| KR | 10-2005-0030260 A | 3/2005 |
| KR | 10-2011-0109788 A | 10/2011 |
| WO | WO 2012/176966 A1 | 12/2012 |

OTHER PUBLICATIONS

Korean Intellectual Property Office, Office Action, Korean Patent Application No. 10-2013-0054950, May 31, 2014, seven pages [with concise explanation of relevance.].
Office Action for Chinese Patent Application No. CN 201410201540.6, Aug. 18, 2016, 11 Pages (With Concise Explanation of Relevance).

* cited by examiner

*Primary Examiner* — Jason Olson
*Assistant Examiner* — Sosina Abebe
(74) *Attorney, Agent, or Firm* — Fenwick & West LLP

(57) ABSTRACT

A touch location sensing panel includes a touch detection region in which a plurality of sensing regions are arranged on a single substrate in two columns, an external wire region provided in an outer portion of the touch detection region, a plurality of transmitting (Tx) electrodes formed in the plurality of the sensing regions, with at least one patch shape, respectively, to sense a location of touch applied to the touch detection region on a second axis, and a plurality of receiving (Rx) electrodes electrically separated from the transmitting electrodes in the plurality of the sensing regions and extended along a second axis to cover the transmitting electrodes, to sense a location of the touch on a first axis.

12 Claims, 6 Drawing Sheets

TOUCH SENSING APPARATUS USING SINGLE LAYER PATTERN AND METHOD FOR MANUFACTURING THE SAME

This application claims priority from and the benefit of Korean Patent Application No. 10-2013-0054950, filed on May 15, 2013, which is hereby incorporated by reference for all purposes as if fully set forth herein.

BACKGROUND OF THE DISCLOSURE

Field of the Disclosure

Exemplary embodiments of the disclosure relate to a touch sensing apparatus using a touch pattern without insulation and a method for manufacturing the same.

Discussion of the Background

A touch sensing apparatus is one of input devices configurating interfaces between a user and an information communication device using various displays. Such a touch sensing apparatus helps a user to directly touch a screen, using an input tool such as his or her hand or a pen, to make it easy to implement inputs more easily.

The touch sensing apparatus may be classified into a resistive type, a capacitive overlay type, an ultrasonic type and an infrared type. The capacitive type touch sensing apparatus has a slim thickness and a good durability. Also, a user can input multi touch, using the capacitive type touch sensing apparatus, such that the capacitive type touch sensing apparatus has been applied to mobile terminals recently.

The capacitive type touch sensing apparatus may be also classified into a self-capacitance type for determining a touch input, using a self-capacitance generated between a touching object and an electrode, a mutual-capacitance type configured of two electrode layers including a driving electrode and a sensing electrode to determine a touch input, using a mutual-capacitance between the two electrodes generated by touch of a touch object.

The self-capacitance type has a circuit configuration is simple and it is easy to realize. However, it is not easy for the self-capacitance type to determine a touch input. The mutual-capacitance type has an advantage of good multi touch determination, compared with the self-capacitance type. However, the mutual-capacitance type has to realize a sensing electrode in a two-layer structure.

Recently, there are technologies under development which integrate electrodes of the mutual-capacitance type touch sensor which as to be realized in the two-layer structure into a single layer, with a trend of a slim touch sensing device. Accordingly, a more complex electrode pattern is applied to the touch sensing device than a conventional electrode pattern and an external wire region of the touch sensing device requires a relatively more complex wire structure. As a result, when manufacturing an external wire region of the touch sensing device, the mutual-capacitance touch sensing apparatus requires a more complex process and there is a disadvantage of a high error rate, compared with a conventional external wire region manufacturing method.

SUMMARY OF THE DISCLOSURE

Exemplary embodiments of the present disclosure provide a touch location sensing panel which can be manufactured with a low manufacturing cost and a simple multilayer structure.

Exemplary embodiments of the present disclosure also provide a touch location sensing panel which uses a limited number of channels in a touch sensing circuit economically and which prevents deterioration of productivity generated if wiring is complex and the number of connectors is increased.

Exemplary embodiments of the present disclosure also provide a touch sensing apparatus which may reduce a rate of errors generated by a gap of a metallic wire pattern in manufacturing an external wire region.

Exemplary embodiments of the present disclosure also provide a touch sensing apparatus which has a conductive pattern having receiving electrodes surround transmitting electrodes, and a method for manufacturing the same.

Exemplary embodiments of the present disclosure disclose a touch location sensing panel includes a touch detection region in which a plurality of sensing regions are arranged on a single substrate in two columns; an external wire region provided in an outer portion of the touch detection region; a plurality of transmitting (Tx) electrodes formed in the plurality of the sensing regions, with at least one patch shape, respectively, to sense a location of touch applied to the touch detection region on a second axis; and a plurality of receiving (Rx) electrodes electrically separated from the transmitting electrodes in the plurality of the sensing regions and extended along a second axis to cover the transmitting electrodes, to sense a location of the touch on a first axis.

A direction in which the plurality of the transmitting electrodes may be connected to the internal wires is opposite to a direction in which transmitting electrodes adjacent to each other along the first axis are connected to the internal wires.

A direction in which the plurality of the transmitting electrodes are connected to the internal wires may be opposite to a direction in which transmitting electrodes adjacent to each other along the second axis are connected to the internal wires.

A direction in which the plurality of the transmitting electrodes are connected to the internal wires may be opposite to a direction in which transmitting electrodes adjacent to each other along the first axis are connected to the internal wires, and a direction in which the plurality of the transmitting electrodes are connected to the internal wires may be opposite to a direction in which transmitting electrodes adjacent to each other along the second axis are connected to the internal wires simultaneously.

The plurality of the transmitting electrodes may be electrically connected to the plurality of the transmitting electrodes arranged in the same locations on the second axis in the external wire region.

The plurality of the receiving electrodes may be formed in preset locations on the first axis to pass the touch detection region along a direction of the second axis.

The touch location sensing panel may further includes a plurality of internal wires arranged in the same layer with the plurality of the transmitting electrodes and the plurality of the receiving electrodes, and connected to plurality of the transmitting electrodes and the plurality of the receiving electrodes to be extended to the external wire region.

Some of the plurality of the internal wires connected to some transmitting electrodes provided in upper end portion of the touch detection region may be extended to an upper external wire region, and some internal wires connected to some transmitting electrodes provided in a lower end portion of the touch detection region may be extended to a lower external wire region.

The plurality of the internal wires may be combinedly extended to an end portion of the external wire region.

Some wires connected to the receiving electro may be extended to one side wire region Regular intervals may be formed between the portions of the sensing regions connected to internal wires of transmitting electrodes adjacent to each other along the second axis.

In another aspect, a touch location sensing panel includes a touch detection region in which a plurality of sensing regions are arranged on a single substrate in two columns along a first axis and a second axis; and an external wire region comprising a wire region provided along an outer area of the touch detection region, wherein the transmitting and receiving electrodes are electrically separated from each other, and some transmitting electrodes arranged on the same locations on the second axis are connected by the wire region of the external wire region, and some receiving electrodes arranged on the same locations on the first axis are passingly connected to an internal surface of the touch detection region, with surrounding the transmitting electrodes.

The substrate may include a transparent window of a display.

The substrate may be formed of a transparent material.

Touch of the transmitting electrodes and the receiving electrodes may be sensed by a touch sensing circuit independently.

The first axis and the second may cross at right angles.

The touch detection region may be connected to a touch sensing circuit for sensing touch based on change in capacitance generated by touch.

The receiving electrodes may cover an outer portion of the transmitting electrode by 70%~90% to increase capacitance and to enhance sensitivity.

In a further aspect, a method for manufacturing a touch sensing apparatus includes preparing a substrate; forming a plurality of conductive patterns on the substrate, the plurality of the conductive patterns comprising a plurality of arranged on a plurality of first axis, a plurality of receiving electrodes electrically separated from the plurality of the transmitting electrodes, extended in a direction of a second axis to cover the plurality of the transmitting electrodes, and a plurality of conductive patterns comprising a plurality of internal wires connected to the plurality of the transmitting electrode, extended to a bonding pad; forming an insulation layer to expose some of the conductive patterns, without forming a via hole in an upper portion of the conductive pattern; and forming a plurality of metallic wires on some of the exposed conductive patterns and the insulation layer.

The preparing the substrate further may include forming a printed layer on the external wire region.

The plurality of the transmitting electrodes arranged on the same first axis may be electrically with each other through the metallic wire pattern.

The insulation layer may be configured to expose a predetermined portion of each conductive pattern, without the via-hole, and the plurality of the conductive patterns is connected with at least one metallic wire through the exposed portion.

Exemplary embodiments of the present disclosure provide a touch location sensing panel which can be manufactured with a low manufacturing cost and a simple multilayer structure.

Exemplary embodiments of the present disclosure also provide a touch location sensing panel which uses a limited number of channels in a touch sensing circuit economically and which prevents deterioration of productivity generated if wiring is complex and the number of connectors is increased.

Exemplary embodiments of the present disclosure also provide a touch sensing apparatus which may reduce a rate of errors generated by a gap of a metallic wire pattern in manufacturing an external wire region.

Exemplary embodiments of the present disclosure also provide a touch sensing apparatus which has a conductive pattern having receiving electrodes surround transmitting electrodes, and a method for manufacturing the same.

It is to be understood that both the foregoing general description and the following detailed description are exemplary and explanatory and are intended to provide further explanation of the disclosed subject matter as claimed.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

DETAILED DESCRIPTION OF THE ILLUSTRATED EMBODIMENTS

Figure 1:
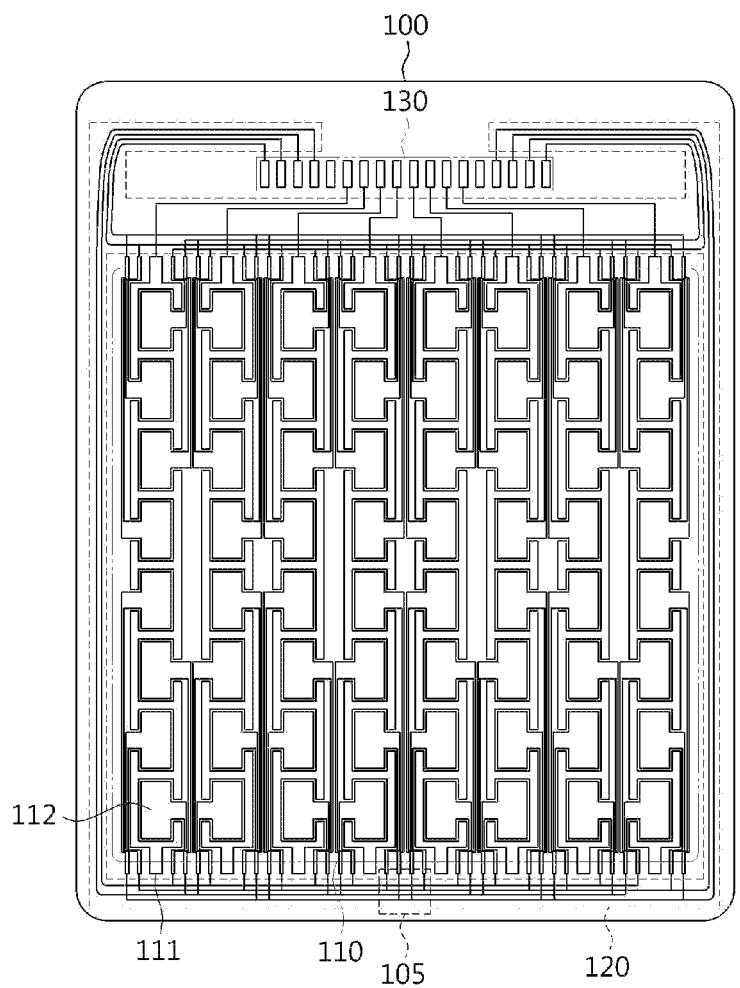
FIG. 1 is a diagram illustrating a sensing pattern for sensing a touch location on a touch location sensing panel according to exemplary embodiments of the disclosure.

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present disclosure.

The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the disclosed subject matter are described herein with reference to cross-section illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one embodiment, a touch sensing apparatus is includes an external wire region having the least gap generated in a wiring and a method for manufacturing the same. Such a method may be applied to a touch sensing apparatus manufactured by integrating driving electrodes and sensing electrodes of a mutual capacitance touch sensor in a single layer structure. At this time, the mutual capacitance touch sensor has to realize the two layer structure. Such the touch sensing apparatus may be realized in a structure disclosed in Korean Patent No. 10-2007-0021332 disclosing "A touch location sensing panel equipped with a simple layer structure manufactured at a low cost" filed on Mar. 7, 2007. The description of the application may be included in the present disclosure as references.

The capacitive touch screen may be classified into a self-capacitance type and a mutual-capacitance type. The self-capacitance type touch screen can determine a touch input location based on a capacitance sensed between a touch object (e.g., a finger) and an electrode in a touch panel, without applying an auxiliary driving signal to recognize a touch input. When a part of the user body touches a touch sensor, a capacitance is generated between the touched body part and a sensing electrode and a sensing circuit electrically connected with a touch sensor provides a touch sensor with electric charge and measures changes in electric voltages or currents, to sense presence of touch on the touch sensor or a touch area.

The mutual-capacitance type touch screen senses touch input, using a touch panel having a driving electrode driving signals are sequentially applied to and a sensing electrode sensing touch, corresponding to a driving signal applying timing, based on a driving-sensing principle. A mutual capacitance is formed between the driving electrode and the sensing electrode according to a driving signal in such a touch panel. When a touch object (e.g., a finger) touches the touch panel, change in mutual capacitances is generated and such change is sensed by the touch panel to determine a touch input location.

In one embodiment, the mutual-capacitance type may enhance resolution of touch input determination by increasing an intersection point of two electrodes (e.g., a node) or increase mutual capacitance change generated between two electrodes, to enhance the accuracy of touch sensing.

FIG. 1 is a diagram illustrating a sensing pattern for sensing a touch location on a touch location sensing panel according to one embodiment.

One surface of the substrate 100 may include a touch detection region 110 provided in a central portion and an external wire region 120 provided in an outer portion of the touch detection region 110. In the touch detection area 110 may be formed a plurality of electrodes and a conductive pattern having a plurality of internal wires to connect the electrodes with the wiring pattern. In the external wire region 120 may be formed an end portion of the plurality of the internal wires and a metallic wire pattern. The conductive pattern may be extended to the external wire region 120.

Referring to FIG. 1, it is shown that the external wire region 120 is a region surrounding a touch detection region 110. In another embodiment, the external wire region may be provided in an outer left end and outer right end of the touch detection region 110. In a further embodiment, the external wire region 120 may be provided in an outer top end or outer lower end of the touch detection region 110.

The touch detection region 110 according to one embodiment may be a display region in which an image or a video is displayed or a non-display region in which no image or video is displayed. Also, the touch detection region 110 may be a touch sensing region receiving a user's touch input and the external wire region 120 may be a region for transmitting a signal to the touch detection region 110 or having a metallic wire pattern for transmitting the signal generated in the touch detection region 110. For convenient description sake, the touch detection region 110 and the external wire region 120 are distinguished from each other. However, the regions 110 and 120 may be integrally formed.

Referring to FIG. 1, a conductive pattern 200 according to one embodiment may include a plurality of receiving electrodes 111 (RX) arranged on a first axis at regular intervals to sense input coordinates of the first axis (a horizontal direction axis) and a plurality of transmitting electrodes 112 (TX) arranged on a second axis at regular intervals to sense input coordinates of the second axis (a vertical direction axis).

The plurality of the receiving electrodes 111 may be longitudinally stretched in a direction along the second axis. The plurality of the transmitting electrodes 112 may be formed as a specific shaped patch (e.g., a rectangular patch). The transmitting electrodes 112 arranged along the same first axis, in other words, transmitting electrodes 112 arranged at the same positions on the second axis may be electrically connected with each other. The plurality of the receiving electrodes may be extended in a direction of the second axis to surround the transmitting electrodes 112, electrically separated from the transmitting electrodes 112.

Referring to FIG. 1, the sensing pattern may include the receiving electrodes 111 longitudinally stretched on a plurality of first axis positions along the second axis and the plurality of the transmitting electrodes 112 arranged on a plurality of second axis positions, with being surrounded by the receiving electrodes 111, respectively. At this time, the number of lines for connecting the receiving electrodes 111 to external devices could be reduced by the pattern of the receiving electrodes 111 surrounding the transmitting electrodes 112, compared with the conventional pattern.

Such the pattern can increase the portions in which the receiving electrodes 111 face the transmitting electrodes 112 and increase capacitance, only to increase touch sensitivity. Specifically, a mutual capacitor structure 119 may be formed between a first axis location sensing region 113 of the receiving electrodes 111 and the transmitting electrode 112 in the first floor structure using the mutual capacitance. As the receiving electrodes 111 surrounds more transmitting electrodes 112, the facing portions between the receiving electrodes 111 and the transmitting electrodes 112 may increase more and the portion in which the mutual capacitor structures 119 are formed may increase more, such that the sensitivity can be enhanced more.

Figure 2:
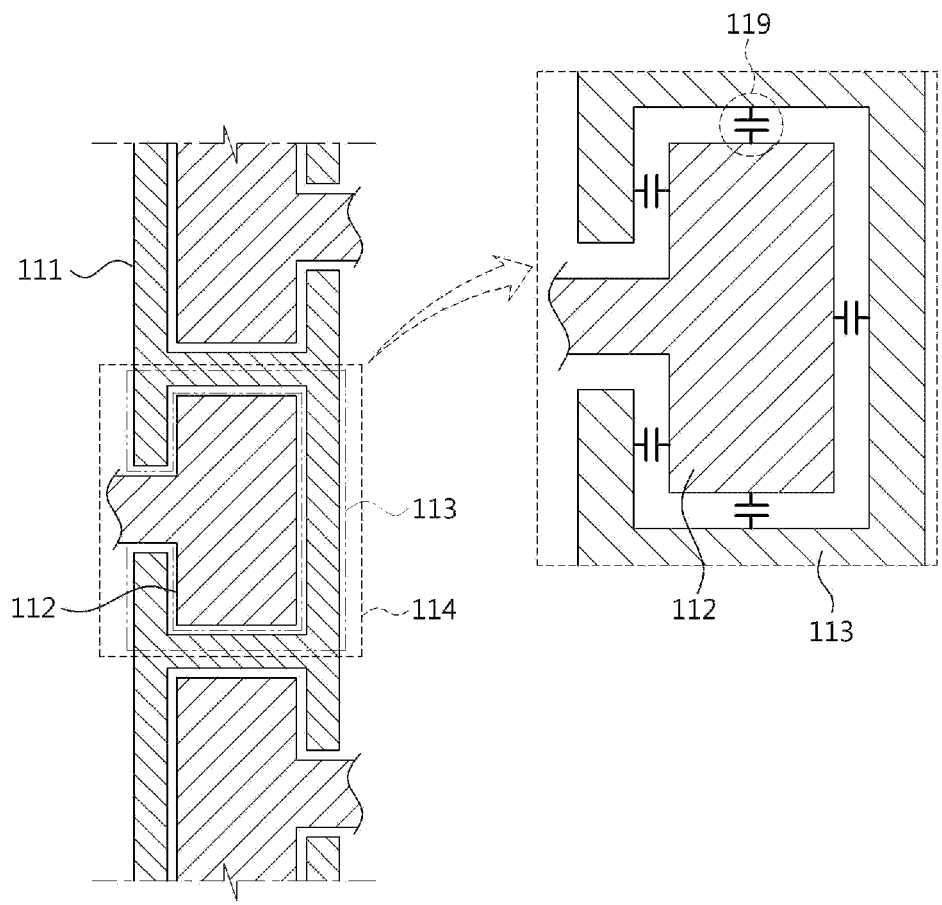
FIG. 2 is an enlarged diagram illustrating a sensing region on a touch location sensing panel according to exemplary embodiments of the disclosure.

In other words, the receiving electrodes 111 surround 70~90% of the transmitting electrodes, such that the facing regions between the transmitting electrodes 112 and the receiving electrodes 111 can increase. As shown in FIG. 2, such the facing portion may increase and more mutual capacitor structures 119 may be formed and the capacitor change may be increased, such that the sensitivity can be enhanced.

In case of an electric capacity type touch location sensing panel, receiving electrodes 111 and transmitting electrodes 112 may formed of a conductive material in a preset pattern. For instance, a touch screen panel may be formed of a transparent conductive material (e.g., ITO). The receiving electrodes 111 and the transmitting electrodes 112 may be extended to the external wire region 120 through internal wires. The external wire region 120 in which internal wire ends and metallic wires are formed may be arranged in an outer portion of the touch detection region 110. Each of the wires in the external wire region 120 may be connected to a touch sensor chip (not shown) connected to the touch screen.

A connection line pattern of the external wire region 120 shown in FIG. 1 as a dotted line may be directly formed on a film where the touch detection region 110 is formed. Alternatively, the connection line pattern may be configurated by bonding a flexible PCB or a rigid PCB to a film for connection to an external touch presence sensing circuit. At this time, wires of the external wire region 120 may be connected to channels 130 of the printed circuit board, respectively.

In one embodiment, the touch location sensing panel having the sensing pattern shown in FIG. 1 may include eight sensing regions in a direction of the second axis and eight sensing regions in a direction of the first axis, which is one of examples and the number of the sensing regions is not limited.

FIG. 2 is an enlarged view illustrating a sensing region on the touch location sensing panel according to one embodiment. As shown in FIG. 2 of the embodiment, each of the sensing regions 114 may have a transmitting electrode 112 provided in the corresponding sensing region 114 and a first axis location sensing region 113 provided in the corresponding sensing region out of the receiving electrode region. The transmitting electrode 112 and the first axis location sensing region 113 may be used in extracting a second axis location element and a first axis location element of each touch location.

Specific patch shaped transmitting electrodes 112 may be formed in each of the sensing regions 114.

The intervals between the internal wires of the transmitting electrodes adjacent to the second axis and the portion of the sensing regions 114 may be regular. In other words, the intervals may be as far as possible regularly.

The transmitting electrodes 112 and the receiving electrodes 111 may be electrically separated from each other, and each of the electrodes 112 and 111 may be connected to the sensing circuit (not shown) through each of independent channels. The touch presence sensing circuit may sense presence of touch in a corresponding sensing region 114 based on change in capacitance generated by the user's touch on a specific sensing region 114. Near the touch detection region 110 shown in FIG. 1 may be provided connection lines connected to 18 channels of the touch presence sensing circuit, respectively.

In one embodiment, a plurality of transmitting electrodes 112 may be connected to the internal wires in an opposite direction to the direction in which another transmitting electrodes 112 adjacent to the transmitting electrodes along the first axis, in other words, in the reverse direction. In another embodiment, a plurality of transmitting electrodes 112 may be connected to internal wires in the reverse direction of the direction in which transmitting electrodes 112 arranged adjacent to each other along the second axis. In a further embodiment, a plurality of transmitting electrodes 112 may be connected to internal wires in the reverse direction of the direction in which transmitting electrodes 112 adjacent to each other along the first axis and in the reverse direction of the direction in which transmitting electrodes 1112 adjacent to each other along the second axis are connected to internal wires.

Some internal wires connected to some transmitting electrodes 112 provided in upper end portion of the touch detection region 110 may be extended to an upper external wire region 120 and other internal wires connected to some transmitting electrodes 112 provided in an lower end portion of the touch detection region 110 may be extended to a lower external wire region 120.

Here, the internal wires connected to the receiving electrodes 111 may be extended to a portion of the external wire region. For instance, the internal wires connected to the receiving electrodes 111 shown in FIG. 1 may be extended to the external wire region 120 arranged in an upper external wire region.

As shown in FIG. 1, receiving electrodes 111 different from each other may be connected to channels different from each other, respectively. The ones arranged in different second axis positions out of the transmitting electrodes 112 may be connected to different channels. In other words, the transmitting electrodes 112 arranged in the same second axis positions out of the ones provided in different sensing regions 114 may be electrically connected to each other. The receiving electrodes 111 or transmitting electrodes 112 electrically connected to each other may be separated from other receiving electrodes 111 or transmitting electrodes 112 not electrically connected to each other and connected to the touch presence sensing circuit through auxiliary channels, only to sense the touch presence independently.

In other words, a touch location may have a second axis location and a first axis location. Information related with the second axis location and the first axis location may be extracted through the channels connected to the transmitting electrodes 112 and the receiving electrodes 111. Accordingly, touch has to be sensed through a channel connected to at least one transmitting electrode 112 and at least one receiving electrode 111, to sense the user touch location, using the touch location sensing channel according to one embodiment.

At this time, a touch area may mean an area adjacent to a touch surface within a distance capable of sensing touch on the sensing region 114, not an area of physical touch on a touch surface. In other words, in case the distance is recognizable as touch by the touch presence sensing circuit even when a central portion of a touch object having elasticity touches on a touch surface, with an edge portion spaced apart a preset distance from the touch surface, the distance may be included in the touch area.

When a touch is sensed through channels corresponding to the plurality of the second axis or first axis locations (in other words, a first exceptional situation), information on the plurality of the second or first axis locations may be used in calculating a more accurate touch location. For instance, when touches are sensed in neighboring sensing regions 114 simultaneously, a touch location sensing circuit calculates an average of second axis locations corresponding to each of the sensing regions 114 to acquire a second axis location corresponding to the calculated average value as a second axis location element of the touch location. In this instance, a determination resolution of the second axis location may be increased to double.

Different from that, even when the transmitting electrode 112 and the receiving electrode 111 connected to channels corresponding to one second axis location and a first axis location in which touch is sensed are not included in the same sensing region 114 (in other words, a second exceptional situation), such information may be used in calculating a more accurate touch location. For instance, touch is sensed from a transmitting electrode 112 of a sensing region 114 located in the first left and the first one from a top and a receiving electrode 111 of a sensing region 114 located in the first left and the second from the top, the touch location sensing circuit may acquire the first left location as a second axis location element and a location between the first and second from the top as a first axis location element. In this instance, the determination resolution of the first axis location may be increased to double.

When using information about the channels in which touch is sensed in the first and second exceptional situations, the determination resolution of the second axis or first axis location may be increased to double.

Meanwhile, it is preferred that a sensing pattern is formed to make the transmitting electrode 112 and the first axis location sensing region 113 have substantially the same area. Having the substantially same area may mean that the areas are similar without affecting the touch presence sensing on the transmitting electrode 112 and the first axis location sensing region 113. If the area of the transmitting electrode 112 is markedly different from the area of the first axis location sensing area 113, the sensitivity of the touch presence sensing in the transmitting electrode 112 and the first axis location sensing area 113 could be differed remarkably. In this instance, even when touch is input normally, the information about the second axis location or the first axis location failed to be acquired.

In the touch sensing apparatus according to one embodiment shown in FIG. 1, the transmitting electrodes 112 arranged in the same locations on the second axis may be electrically connected with each other through one wire in the external wire region 120. The receiving electrodes 111 may be formed in preset locations on the first axis across the touch detection region 110 in the direction of the second axis. In other words, they may be connected to the receiving electrodes arranged in the same locations on the first axis in the touch detection region 110.

Figure 3A:
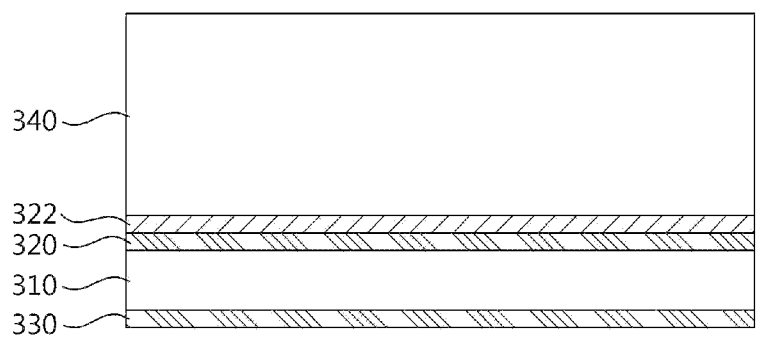
FIGS. 3A and 3B are diagrams illustrating one example of a multilayer structure of a touch location sensing panel according to exemplary embodiments of the disclosure.
Figure 3B:
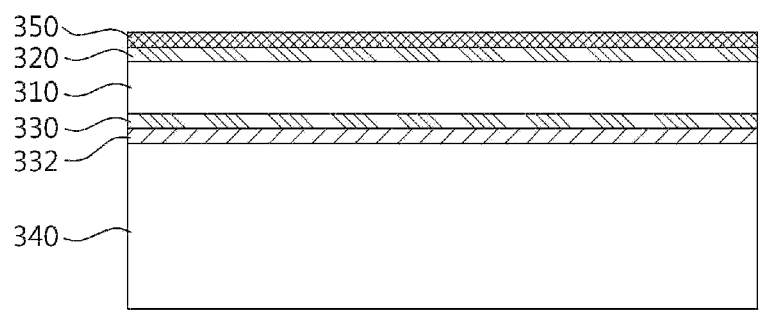

FIG. 3 is a diagram illustrating an example of a multi-layered structure formed in the touch location sensing panel according to one embodiment. In FIGS. 3A and 3B, a multilayer structure of the touch location sensing panel of which a plane structure is shown in FIGS. 1 and 2. FIGS. 3A and 3B illustrate multilayer structures different from each other which can be applied to the embodiment, respectively.

As shown in FIGS. 3A and 3B, the sensing pattern shown in FIG. 1 may be arranged on a sensing region pattern layer 320 formed on one surface of a single film 310. In other words, the receiving electrodes (111, see FIG. 1) and the transmitting electrodes (112, see FIG. 2) may be formed in the sensing region pattern layer 320 together. In a touch screen, the film 210 is a transparent film and the sensing region pattern layer 320 and a blocking layer 330 may be formed of a transparent conductive material (e.g., ITO).

A blocking layer 330 may be provided in a back surface of the film 310 shown in FIGS. 3A and 3B. The touch location sensing panel may be installed on the outermost surface of a digital device touchable by the user, because of its characteristics. Accordingly, the touch location sensing panel can be electrically affected by an internal circuit of the device. An electrical noise can be drawn in to the touch pad panel from an electric circuit provided in a back surface of the touch pad panel or an electric circuit and a display provided in a back surface of the touch screen. The blocking layer may block such electric noise from the touch location sensing panel. In case the blocking layer 330 is provided, an error caused by the electric noise can be prevented and the performance of the touch location sensing panel can be enhanced.

In FIG. 3A, the film 310 having the sensing region pattern layer 320 formed in one surface and the blocking layer 330 formed in the other opposite surface may be attached to a window panel 340 through an adhesive layer 322. The window panel 340 may be functioned as a touch surface for the user and as a substrate supporting the film 310. For a normal operation of the electric capacity touch location sensing panel, the window panel 340 may be formed of a material having a uniform dielectric constant, with a uniform thickness.

Meanwhile, in FIG. 3B, the film 310 is attached to a front surface of the window panel 340 by the adhesive layer 332 and a protection layer 350 may be provided in a front surface of the film 310 having the sensing region pattern layer 320 and the blocking layer 330 formed in both surfaces. In FIG. 3B different from FIG. 3A, the window panel 340 may be functioned as a substrate supporting the film 310 and the protection layer 350 as a touch surface for the user. The protection layer 350 may be formed of a material which can protect the film 310 from mechanical and chemical damage. In case of the touch screen, the protection layer may be formed of a material having a high transparency. It is preferred that the protection layer 350 is formed of a material having a uniform dielectric constant, with a uniform thickness.

The multilayer structure shown in FIGS. 3A and 3B may be selectively applied in consideration of a housing shape of the digital device having a touch location sensing panel mounted therein.

As mentioned above, the FIGS. 3A and 3B show that the pattern layer 320 and the blocking layer 340 formed of a conductive material are formed in both surfaces of the single film 310. However, the blocking layer 340 is not necessarily formed in the other surface of the film 310 and it may be formed on an auxiliary film different from the film 310. In this instance, the film 310 having the sensing region pattern layer 320 formed in one surface may be deposited on a front surface of another film having the blocking layer formed therein.

In another embodiment, the blocking layer 310 may be omitted for a simple multilayer structure, in case the electric noise is not severe. Similarly, the adhesive layer 332 may not be applied according to operation conditions.

Figure 4:
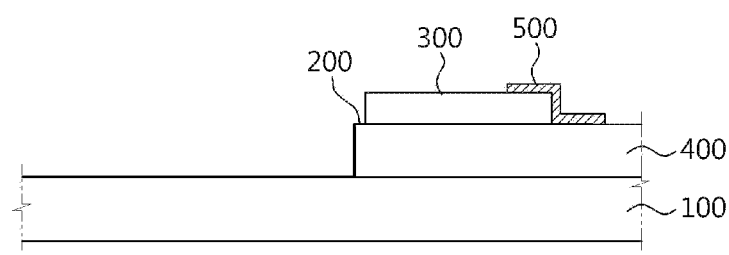
FIG. 4 is a diagram partially illustrating a cross section of a touch sensing apparatus having an external wire region according to exemplary embodiments.

FIG. 4 is a diagram partially illustrating a cross section of the touch sensing apparatus according to the embodiment. The touch sensing apparatus according to one embodiment may include a substrate 100, a printed layer 400 arranged in an external wire region (120, see FIG. 1) of the substrate 100, a conductive pattern 200 formed on one surface of the substrate 100, an insulation layer 300 for electrically separating the conductive pattern 200 and a metallic wire pattern and a metallic wire pattern 500 connected with at least one conductive pattern 200. The metallic wire pattern 500 may be connected to a touch sensor chip (not shown) to electrically connect the conductive pattern 200 with the touch sensor chip.

The substrate 100 may be functioned as a support for supporting the printed layer 400, the conductive pattern 200 and the insulation layer 300. The substrate 100 may be a transparent substrate. When it is a transparent substrate, the substrate 100 may be formed of, a high strength material (e.g., tempered glass and acryl resin21) or rigid PET (Polyethylene Terephthalate), PC (Polycarbonate), PES (Polyethersulfone), PI (Polyimide), PMMA (PolyMethly MethaAcrylate) which are applicable to a flexible display. Also, the substrate 100 may be a cover glass applied to the touch screen. In this instance, the cover glass may be formed of tempered glass or high strength plastic. Typically, the substrate 100 may be designed to have a preset thickness of 0.3t or more for a protection function.

The printed layer 400 may be formed in a predetermined portion of one surface of the substrate 100. In one embodiment, one or more printed layers 400 may be arranged on an external wire region (120, see FIG. 1) provided in one surface of the substrate 100, as shown in FIG. 4. As mentioned above, the external wire region (120, see FIG. 1) may be a non-display region or a region where the metallic wire pattern may be provided. Accordingly, the external wire region 120 need not be visible by the user and one or more printed layers 400 may be formed on the external wire region (120, see FIG. 1) to hide the metallic wire pattern provided in the external wire region (120, see FIG. 1).

In another embodiment, the printed layer 400 may be formed of an opaque material. For instance the printed layer 400 may be may be formed of a material visible black. For convenient description sake, it is shown that the printed layer 400 is configured of a single layer. The printed layer 400 may be configured of a plurality of layers to hide the metallic wire pattern region. For instance, the printed layer 400 may be configured of a single tone printed layer and a double tone printed layer.

A plurality of conductive patterns 200 may be arranged on one surface of the substrate 100. The conductive pattern 200 may be formed of a transparent conductive material. For instance, examples of the transparent conductive material may include an oxide such as ITO (Indium Tin Oxide), IZO (Indium Zinc Oxide), ZO (Zinc Oxide), carbon-nanotube, metallic nano wire, conductive polymer. The thickness of the conductive patterns 200 may differ according to the transparent conductive material and it may be approximately 10 nm~10 μm.

To fabricate the conductive pattern 200, one surface of the substrate 100 is sputtered and etched in accordance with the shape of the conductive pattern 200. The etched pattern may be integrally formed with the one surface of the substrate 100. For instance, a transparent conductive material (e.g., ITO) is sputtered on the surface of the substrate 100 at a temperature of approximately 130° C.~150° C. and then the 1 sputtered conductive material is etched in accordance with the shape of the conductive pattern 200, only to form the conductive pattern 200.

The conductive patterns 200 may be arranged on one surface of the substrate 100 or one the external wire region (120, see FIG. 1). The sensing electrode (111, see FIG. 1) and 112, see FIG. 2) in which a sensing signal for determining presence of the user's touch is generated may be arranged in the touch detection region (110, see FIG. 1) and the metallic wire pattern 500 may be arranged in the external wire region (120. See FIG. 1).

The conductive pattern 200 may include a metallic wire pattern for transmitting a sensing signal of the sensing electrode, the driving electrode and/or sensing electrode or a driving signal to a driving electrode. The conductive pattern 200 shown in FIG. 1 may be one of examples having the receiving electrodes surround the transmitting electrode. The shape of the sensing and driving electrode and the shape of the metallic wire pattern may be designed in various ways. For instance, the portion where the transmitting electrode and the receiving electrode face each other is increasing.

Figure 5:
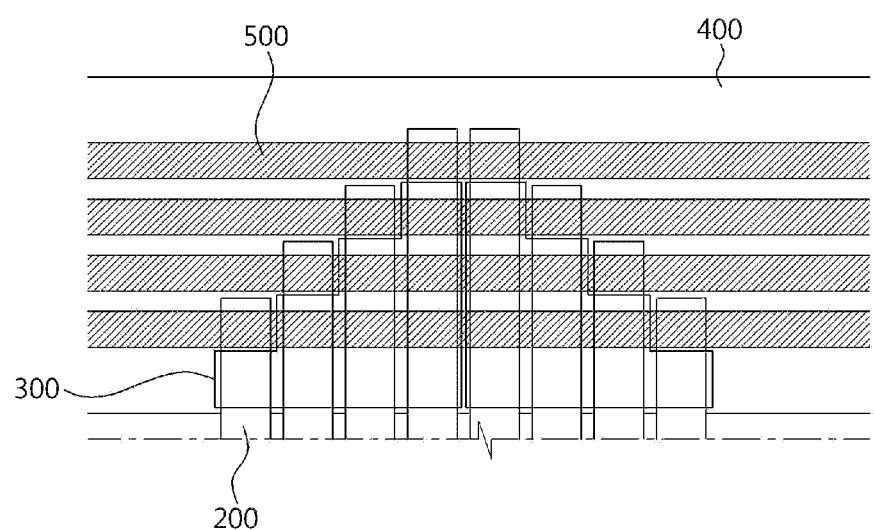
FIG. 5 is a diagram schematically illustrating a structure of an external wire region provided in a touch sensing apparatus according to exemplary embodiments.

FIG. 5 is a diagram schematically illustrating a structure of an external wire region provided in a touch sensing apparatus according to exemplary embodiments. FIG. 5 is an enlarged diagram partially illustrating a predetermined portion (105, see FIG. 1) of the external wire region shown in FIG. 1.

Referring to FIG. 5, the external wire region (120, see FIG. 1) provided in the touch sensing apparatus according to the embodiment may be arranged so as for the lengths of the internal wires extended from the transmitting electrodes formed in the touch detection region (110, see FIG. 1) to be sequentially increased or reduced. Internal wire ends which have to be electrically connected with each other may have the same length.

The metallic wire pattern 500 may have one end connected to the touch sensor chip and the other end connected to the conductive pattern 200 extended from the plurality of transmitting electrodes, in other words, an end portion of the internal wire. For that, the metallic wire pattern may be formed to pass the ends of the internal wires extended from the transmitting electrodes which have to be connected thereto, as shown in FIG. 5.

As shown in FIG. 5, between the conductive pattern 200 and the metallic wire pattern 500 may be an insulation layer 300 may be formed to prevent the metallic wire pattern 500 from being connected to another conductive pattern which is not the conductive pattern supposed to be connected. The insulation layer 300 according to one embodiment may be formed in the other region except predetermined end portions of the conductive patterns 200 sequentially arranged with different lengths. In other words, the insulation layer 300 may not be formed in an overall external wire region (120, see FIG. 1), which is a closed type, but only in the internal wire end portion, which is an open type. The insulation layer 300 may be formed in a stepped shape over neighboring conductive patterns. The metallic wire pattern 500 may be electrically connected with the transmitting electrodes arranged in the same locations on the second axis in the touch detection region according to such a shape of the insulation layer 300, while it is electrically shortened from the transmitting electrodes arranged in other locations on the second axis.

The process of forming the insulation layer 300 may be the same as a process of forming a conventional insulation layer 300. In one embodiment, the insulation layer 300 may be formed of photo solder resist. In other words, materials such as an oxide which can have a negative impact on adhesion between a surface of the substrate and photo solder resist may be removed. After that, the insulation layer 300 may be formed through a fining process for forming illumination, a printing process for printing photo solder resist ink on a surface of the substrate, a pre-cure process for eliminating adhesion by eliminating a solvent of the printed ink, an expose process for vulcanizing the resist, using infrared rays irradiated to a preset portion of the insulation layer 300, a development process for eliminating a portion in which a portion with no infrared polymerization after the exposure, using a dissolved developing solution, and a post cure process for volcanizing the epoxy resin provided in the insulation layer 300. The photo solder resist ink may be any ink used conventionally. The process of forming the insulation layer 300 may further include a UV volcanizing process performed after the post cure process.

In one embodiment, the insulation layer 300 may include a projection (not shown) corresponding to the conductive pattern 200, which is disclosed in Korean Patent No. 10-2011-0146144 titled "Printed Circuit Board and Manufacturing Method Thereof" filed on Dec. 29, 2011. The detailed description of the application may be included in the disclosure as references.

Meanwhile, the insulation layer 300 may be formed to cover the overall portion of the external wire region (120, see FIG. 1) to insulate the conductive pattern 200 and the metallic wire pattern 500 from each other. A via hole is formed only in a portion where the conductive pattern 200 supposed to be connected to the metallic wire pattern 500 and the metallic wire pattern 500 are overlapped, such that the wires provided in upper and lower portions can be connected with each other. In this instance, the metallic wire pattern has to be filled in the via hole and a circular-shaped gap generated by the via hole makes the thickness of the wire line get thinner along an outer portion of the via hole disadvantageously.

The touch sensing apparatus according to one embodiment is not formed in the overall portion of the external wire portion but a step-shaped insulation layer is formed not to cover a predetermined portion of the internal wire end portion extended to the external wire region (120, see FIG. 1), such that only a linear-shaped gap may be generated in one direction. Accordingly, an error rate in fabricating the external wire region may be reduced.

Figure 6:
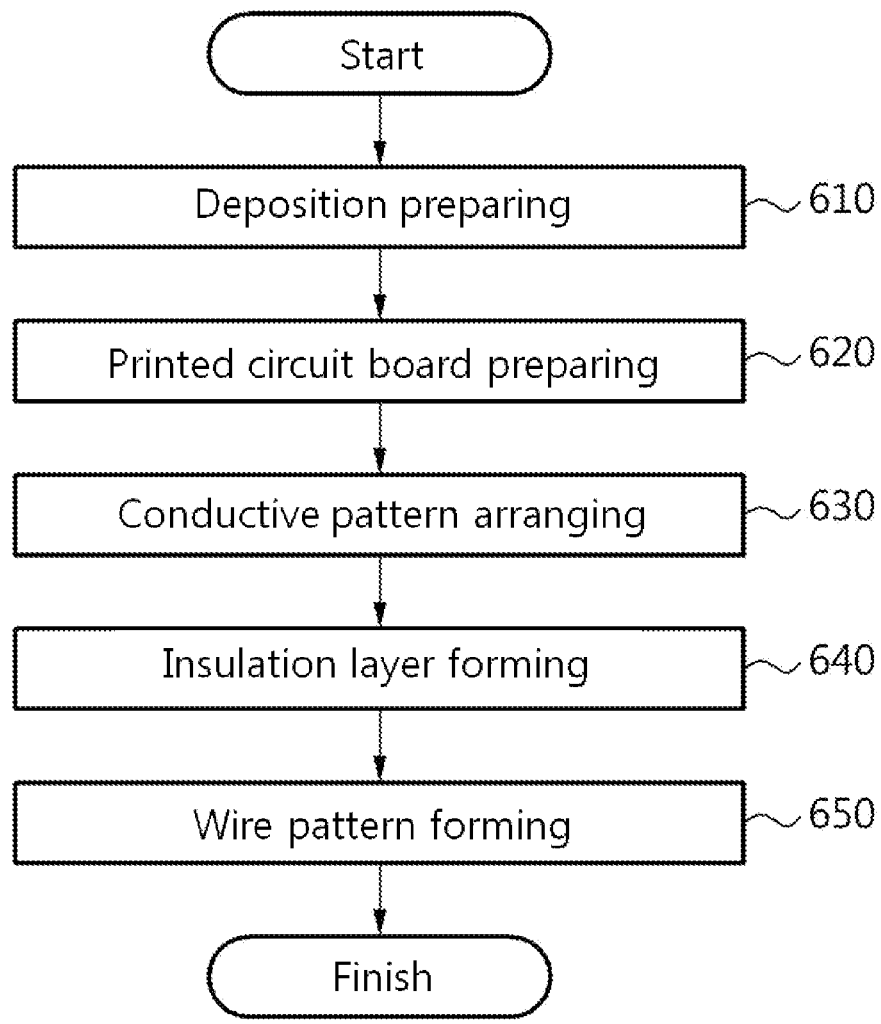
FIG. 6 is a diagram illustrating an operation of manufacturing a touch sensing apparatus according to one embodiment of the disclosure.

FIG. 6 is a flow chart illustrating an operation for manufacturing a touch sensing apparatus according to one embodiment.

First of all, in a step 610, a substrate is prepared and the substrate is substantially equal to the substrate shown in FIGS. 1 through 5, such that repeated description hereof can be omitted.

In a step 620, one or more printed layers may be arranged on the external wire region (120, see FIG. 1) provided in one surface of the substrate. The printed layer is substantially equal to the printed layer shown in FIGS. 1 through 4 and repeated description thereof will be omitted.

Hence, in a step 630, a plurality of conductive patterns may be arranged on one surface of the substrate. The conductive patterns may be arranged on the printed layer of the external wire region (120, see FIG. 1) provided in one surface of the substrate. The conductive pattern is substantially equal to the conductive pattern shown in FIGS. 1 through 6 and repeated description thereof will be omitted.

In a step 640, an insulation layer is formed on one surface of the substrate and the conductive pattern. The shape of the insulation is substantially equal to that of the insulation layer shown in FIGS. 1 through 5 and detailed description of the shape is omitted. the shape of the metallic wire pattern 500 and the arrangement among the wire pattern 500, the conductive pattern and the insulation layer 300 is substantially equal to the arrangement among the wire pattern 500, the conductive pattern 500 and the insulation layer 300 are substantially equal to the shape of the metallic wire pattern 500 and the arrangement between the bonding pad and the conductive pattern shown in FIGS. 4b, 5 and 6 and repeated description thereof is omitted.

It will be apparent to those skilled in the art that various modifications and variations can be made in the present disclosure without departing from the spirit or scope of the disclosed subject matter.

Thus, it is intended that the present disclosure cover the modifications and variations of the disclosed subject matter provided they come within the scope of the appended claims and their equivalents.

What is claimed is:

1. A touch location sensing panel comprising:
    a touch detection region in which a plurality of sensing regions are arranged on a single substrate in two columns;
    an external wire region provided in an outer portion of the touch detection region;
    a plurality of transmitting (Tx) electrodes formed in the plurality of the sensing regions, with at least one patch shape, respectively, to sense a location of touch applied to the touch detection region on a second axis; and
    a plurality of receiving (Rx) electrodes electrically separated from the transmitting electrodes in the plurality of the sensing regions and extended along the second axis to cover the transmitting electrodes, to sense a location of the touch on a first axis;
    wherein a direction in which the plurality of the transmitting electrodes are connected to internal wires is opposite to a direction in which transmitting electrodes adjacent to each other along the second axis are connected to the internal wires,
    wherein a first transmitting electrode and a second transmitting electrode adjacent to each other along the second axis are arranged in the same locations on the first axis,
    wherein a direction in which the first transmitting electrode is connected to internal wires is opposite to a direction in which the second transmitting electrode is connected to the internal wires.

2. The touch location sensing panel of claim 1, wherein a direction in which the plurality of the transmitting electrodes are connected to the internal wires is opposite to a direction in which transmitting electrodes adjacent to each other along the first axis are connected to the internal wires.

3. The touch location sensing panel of claim 1, wherein a direction in which the plurality of the transmitting electrodes are connected to the internal wires is opposite to a direction in which transmitting electrodes adjacent to each other along the first axis are connected to the internal wires, and a direction in which the plurality of the transmitting electrodes are connected to the internal wires is opposite to a direction in which transmitting electrodes adjacent to each other along the second axis are connected to the internal wires simultaneously.

4. The touch location sensing panel of claim 1, wherein the plurality of the transmitting electrodes are electrically connected to the plurality of the transmitting electrodes arranged in the same locations on the second axis in the external wire region.

5. The touch location sensing panel of claim 1, wherein the plurality of the receiving electrodes are formed in preset locations on the first axis to pass the touch detection region along a direction of the second axis.

6. The touch location sensing panel of claim 1, further comprising:
a plurality of internal wires arranged in the same layer with the plurality of the transmitting electrodes and the plurality of the receiving electrodes, and connected to plurality of the transmitting electrodes and the plurality of the receiving electrodes to be extended to the external wire region.

7. The touch location sensing panel of claim 6, wherein some of the plurality of the internal wires connected to some transmitting electrodes provided in an upper end portion of the touch detection region are extended to an upper external wire region, and
some internal wires connected to some transmitting electrodes provided in a lower end portion of the touch detection region are extended to a lower external wire region.

8. The touch location sensing panel of claim 6, wherein the plurality of the internal wires are combinedly extended to an end portion of the external wire region.

9. The touch location sensing panel of claim 1, wherein some wires connected to the receiving electrodes are extended to one side wire region.

10. The touch location sensing panel of claim 1, wherein regular intervals are formed between the portions of the sensing regions connected to internal wires of transmitting electrodes adjacent to each other along the second axis.

11. A method for manufacturing a touch sensing apparatus comprising:
preparing a substrate;
forming a plurality of conductive patterns on the substrate, the plurality of the conductive patterns comprising a plurality of arranged on a plurality of first axis, a plurality of receiving electrodes electrically separated from the plurality of the transmitting electrodes, extended in a direction of a second axis to cover the plurality of the transmitting electrodes, and a plurality of conductive patterns comprising a plurality of internal wires connected to the plurality of the transmitting electrode, extended to a bonding pad;
forming an insulation layer to expose some of the conductive patterns, without forming a via hole in an upper portion of the conductive pattern; and
forming a plurality of metallic wires on some of the exposed conductive patterns and the insulation layer;
wherein a direction in which the plurality of the transmitting electrodes are connected to internal wires is opposite to a direction in which transmitting electrodes adjacent to each other along the second axis are connected to the internal wires,
wherein a first transmitting electrode and a second transmitting electrode adjacent to each other along the second axis are arranged in the same locations on the first axis,
wherein a direction in which a first transmitting electrode is connected to internal wires is opposite to a direction in which a second transmitting electrode is connected to the internal wires.

12. The method for manufacturing the touch sensing apparatus of claim 11, wherein the preparing the substrate further comprises forming a printed layer on the external wire region.

* * * * *